United States Patent [19]

Blake et al.

[11] 4,410,933
[45] Oct. 18, 1983

[54] LUMINAIRE TRUNNION DEGREE MARKER AND RESET STOP

[75] Inventors: Walter R. Blake, Hendersonville; Jerry R. Plemmons, West Asheville, both of N.C.

[73] Assignee: General Electric Company, Schenectady, N.Y.

[21] Appl. No.: 304,248

[22] Filed: Sep. 21, 1981

[51] Int. Cl.³ .............................................. F21P 5/00
[52] U.S. Cl. .................................. 362/371; 248/282; 248/324; 362/269; 362/287; 362/417; 362/427; 362/430
[58] Field of Search ................ 248/282, 324; 362/269, 362/287, 371, 417, 427, 430

[56] References Cited

U.S. PATENT DOCUMENTS

| | | | |
|---|---|---|---|
| 1,915,967 | 6/1933 | Bailey | 362/371 X |
| 2,166,394 | 7/1939 | Crossley | 362/371 |
| 3,476,925 | 11/1969 | Adra | 362/269 |
| 3,505,515 | 4/1970 | Adra | 362/371 |
| 4,143,413 | 3/1979 | Kelly | 362/431 |
| 4,379,321 | 5/1983 | Plemmons et al. | 362/431 |

*Primary Examiner*—Stephen J. Lechert, Jr.
*Attorney, Agent, or Firm*—Ernest W. Legree; Philip L. Schlamp; Fred Jacob

[57] ABSTRACT

A trunnion degree marker and reset stop for a luminaire indicating the angle of aim and providing a positive stop to facilitate resetting after service. It comprises a flat plate having a trunnion bolt hole, an arcuate slot around it with angle markings, and a screw extending therethrough for locking the plate to the trunnion bracket independently of the trunnion bolt. The plate has a foot protruding at an angle and turned toward the housing for engaging a shoulder stop cast as an integral part of the housing.

4 Claims, 3 Drawing Figures

LUMINAIRE TRUNNION DEGREE MARKER AND RESET STOP

The invention relates to a trunnion degree marker and reset stop for a luminaire whose function is to indicate at what angle the luminaire is aimed and provide a positive stop to facilitate resetting after displacement for service.

BACKGROUND OF THE INVENTION

Spotlights and floodlights often must be aimed along specific axes in order to fit an overall lighting scheme. Such aiming is generally laborious and time consuming. If the lights are moved for relamping or cleaning, they must be reset thereafter to the original aim and it is desirable to do so without having to repeat the original laborious procedure. The luminaire trunnion degree marker and reset stop is used for this purpose.

By way of example, an outdoor sports stadium may be lit by several hundred floodlight type luminaires which are clustered in light towers located on top of the grandstand surrounding the field. Each fixture must be aimed at a particular designated point on the field for most efficient use in achieving the desired lighting pattern on the playing surface. Blueprints are prepared indicating for each fixture its coordinating point on the field. The entire playing surface is walked off along quadrant lines a suitable distance apart, say 30'. At the quadrant line intersections, a white paper plate with the corresponding fixture's blueprint number is nailed to the ground. An electrician in the light tower then contacts by radio an associate standing amidst the sea of paper plates in order to make the correlation of a given fixture to its plate. The fixture is equipped with a simple sight or aiming device through which the electrician can aim at the designated paper plate. The electrician then tightens the trunnion bolts to lock the floodlight in its aimed attitude and this procedure is repeated for every floodlight.

In the foregoing example and in many other applications, the floodlights are aimed down, often overhanging a parapet or ledge, and it would be very difficult and possibly dangerous to attempt to service the fixture in that attitude. The common practice for relamping is to loosen the two trunnion bolts and tilt the fixture back. The electrician can then open the lens or cover and conveniently replace the lamp by reaching down into the fixture. After relamping it should be possible to simply and accurately reset the floodlight to its original aim, and the function of the luminaire trunnion degree marker and reset stop is to permit this.

SUMMARY OF THE INVENTION

The object of the invention is to provide an inexpensive and versatile arrangement requiring the minimum number of parts which will indicate at what angle a luminaire is aimed and provide a positive stop for accurately retrieving the original aim after tilting for service.

A luminaire trunnion degree marker and reset stop device embodying the invention is used in combination with a luminaire which is supported by a trunnion bracket with bolts on each side for mounting the luminaire in a pivotable manner on a support structure. Of course the luminaire is of a floodlight or spotlight type which must be aimed and comprises a housing containing a socket for accommodating an electric lamp, and an optical assembly producing a beam of light when the lamp is energized. The device comprises a flat plate, suitably of aluminum, having a short foot extending at an angle thereto. The plate has a hole therein for accommodating a trunnion bolt and an arcuate slot partly surrounding the hole with angle degree markings along the slot. The plate is mounted against the trunnion with one of the trunnion bolts extending through the hole and with the foot turned toward the housing. A screw extending through the slot is used to lock the plate to the trunnion bracket independently of the trunnion bolt. The housing is provided with a shoulder stop for engagement by the foot when the luminaire is properly aimed and the device is locked against it. Loosening of the trunnion bolts allows the housing to be tilted for service and then reset to its original aim by bringing the shoulder stop home against the foot.

In a preferred embodiment the shoulder stop is cast as an integral part of the housing and does not protrude beyond the confines of the casting. This eliminates the possibility of damage to the stop during shipment or subsequently in the field and avoids the use of a protruding stop pin which entails extra cost and is easily damaged. The foot of the degree marker and reset stop device is directed inward toward the housing so that there are no protrusions which could be damaged or broken.

DETAILED DESCRIPTION

Figure 1:
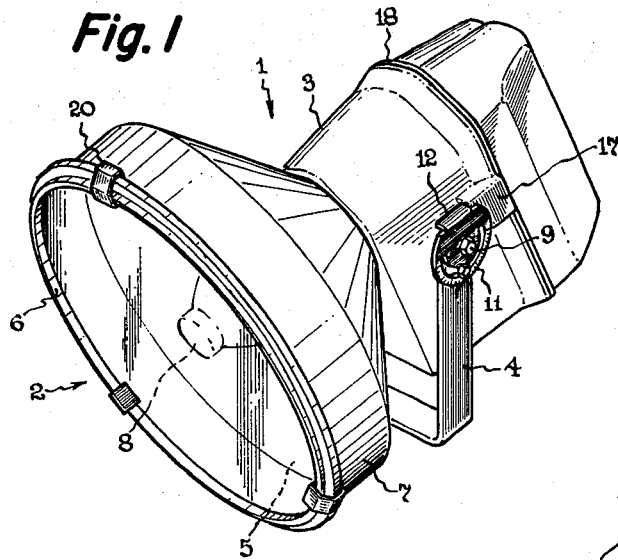
FIG. 1 is a pictorial view of a trunnion-mounted floodlight luminaire having degree marker and reset stop features embodying the invention, shown aimed down with the foot of the marker plate engaging the reset stop.
Figure 2:
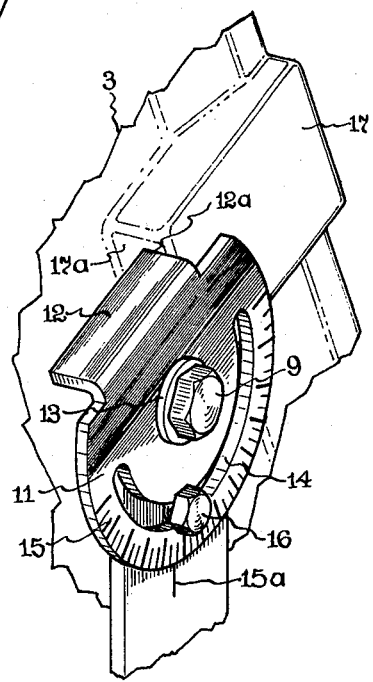
FIG. 2 is an enlarged view of the trunnion degree marker and reset stop portion of FIG. 1.

Referring to FIGS. 1 and 2, there is shown a floodlight luminaire 1 embodying the invention comprising an optical assembly 2 secured to a ballast housing 3 which is supported by a trunnion bracket 4. The optical assembly comprises reflector 5 having an open front closed by a light-transmitting cover or lens 6 attached to an outer casing 7. The lens is removable for access to a high intensity discharge lamp 8, here illustrated as a metal halide discharge lamp, which is screwed into the usual socket (not shown). The ballast housing 3 encloses the heavy ballast and other electric circuit elements for regulating the lamp current. The housing shown is of metal, suitably diecast aluminum for lightness together with adequate strength. More recently outdoor luminaires using plastic housings have become known, as disclosed for instances in copending application Ser. No. 232,709, filed Feb. 9, 1981, of Plemmons and Taylor, entitled "Plastic Heavy Duty Laminaire" and assigned to the same assignee as the present invention. The degree marker and reset stop features of the present invention may be utilized as well with such plastic housings.

The laminaire is mounted in a pivotable manner by means of a trunnion bracket 4 formed from a sturdy metal bar bent to a yoke shape. Trunnion bolts 9 extending through holes in the ends of the bar screw into threaded apertures in the side walls of housing 3 for releasably locking it to the trunnion bracket. The bracket may be attached in any suitable manner to a support structure or part of a building, and has sufficient depth to allow the floodlight to be tilted through a wide range to permit aiming and also to facilitate service.

In the illustrated embodiment the degree marker and reset stop device comprises flat plate 11 having a short foot 12 turned at right angles thereto and extending inward toward housing 3, as best seen in FIG. 2. The plate has a central hole therein for accommodating a trunnion bolt and is shown with a spring washer 13 under the head of bolt 9. The central hole is surrounded over about 180° by an arcuate slot 14. Plate 11 is conveniently and economically made as a stamping from sheet aluminum and degree markings 15 are provided extending along the slot. A line mark 15a engraved in the trunnion allows the angle of aim to be read from the degree markings. A screw 16 extends through the arcuate slot into the trunnion bracket and is used to lock the plate to the bracket independently of the trunnion bolt 9.

In the preferred embodiment illustrated, a shoulder stop 17 is cast as an integral part of the ballast housing 3. Its location and dimensions are such that its front surface 17a engages the rear edge 12a of the foot when marker and stop device 11 is centered relative to a vertically mounted trunnion bracket 4. Since the trunnion bolts engage the luminaire at a place where the width of the housing is less than at the seam 18 between the front and rear portions of housing 3, the stop 17 need protrude very little if at all beyond the confines of the casting. This eliminates possibility of damage to the stop during shipment or subsequently in the field during installation or service of the fixture. Of course it avoids the need for a protruding stop pin which would entail extra cost and is easily damaged.

Figure 3:
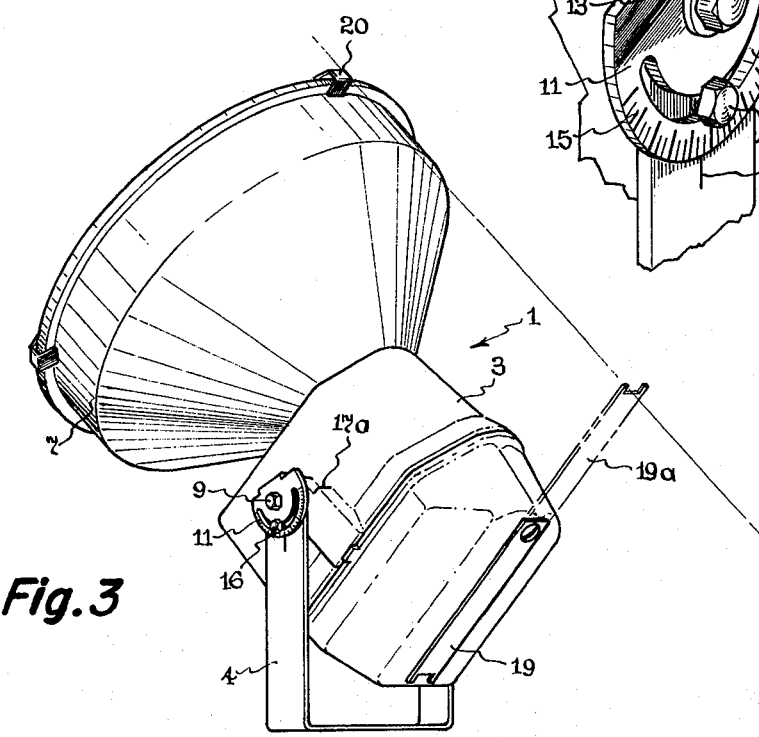
FIG. 3 shows the luminaire tilted up for service with the stop disengaged from the foot.

In FIG. 1 the floodlight is shown aimed down, possibly at an angle of about 30° below the horizontal. For aiming purposes a simple sight is provided by swinging up metal bar 19 which is pivotally mounted on the back of housing 3. The free end of the bar has a forked or double-tine configuration whereby it may be used in the manner of a riflesight together with upper lens clamp 20. With the floodlight properly aimed, the marker stop plate 11 is adjusted so that foot 12 is fast against surface 17a of the stop and both trunnion bolts 9 are tightened. Locking screw 16 is also tightened and aiming device 19 is swung down to its stored location as shown in FIG. 3. Subsequently when the need arises to service the fixture as for relamping, the trunnion bolts are loosened and the fixture is tilted up as shown in FIG. 3. If more convenient in order to make access easier, the fixture may be swung until the floodlight is aimed up or even beyond the vertical. Locking screw 16 maintains the marker and stop plate in its original adjustment so that after service the fixture need only be tilted back until surface 17a of the stop engages the edge of the foot 12 of the marker stop plate. The trunnion bolts are then tightened and the fixture is back to its original aim.

The preferred embodiment which has been illustrated and described is intended by way of example only and various changes and modifications may be made without departing from the scope or spirit of the invention as defined by the appended claims.

What we claim as new and desire to secure by Letters Patent of the United States is:

1. In combination:
    a luminaire comprising a housing containing means for accommodating an electric lamp and an optical assembly producing a beam of light when the lamp is energized,
    a trunnion bracket and trunnion bolts for mounting the luminaire in a pivotable manner on a support structure,
    a degree marker and reset stop device to facilitate aiming said luminaire and resetting it to its original aim after it has been tilted for service, comprising a flat plate having a short foot projecting therefrom, the plate having a hole therein, an arcuate slot surrounding the hole, said plate being mounted against the trunnion with one of the trunnion bolts extending through the hole, and a screw extending through the slot for locking the plate to the trunnion bracket independently of the trunnion bolt,
    and a stop on the housing for engagement by said foot when a luminaire is aimed and the device is fast against it, loosening of the trunnion bolts thereafter allowing the housing to be tilted for service and then reset to its original aim by bringing the shoulder stop home against said foot.

2. The combination of claim 1 wherein said foot protrudes at an angle from said plate and is turned toward said housing for engaging said stop.

3. The combination of claim 1 wherein said foot protrudes at an angle from said plate and is turned toward said housing for engaging said stop, and said stop is a shoulder stop cast as an integral part of the housing and barely protruding beyond its confines.

4. The combination of claim 1 including angle markings in said plate extending along said slot to indicate the aim of said laminaire.

* * * * *